United States Patent [19]

Emmerich et al.

[11] Patent Number: 4,656,534

[45] Date of Patent: Apr. 7, 1987

[54] ANTI-ADHESION DEVICE FOR MAGNETIC TAPE DRIVE

[75] Inventors: Robert D. Emmerich, Loveland; Leslie G. Christie, Jr., Greeley, both of Colo.

[73] Assignee: Hewlett-Packard Company, Palo Alto, Calif.

[21] Appl. No.: 838,218

[22] Filed: Mar. 10, 1986

[51] Int. Cl.$^4$ ............................................. G11B 5/008
[52] U.S. Cl. ........................................................ 360/71
[58] Field of Search ........................................ 360/71

Primary Examiner—George G. Stellar
Attorney, Agent, or Firm—William E. Hein; Michael E. Attaya

[57] ABSTRACT

A device which may be incorporated in a conventional magnetic tape transport prevents adhesion between the magnetic tape and elements of the tape transport such as the magnetic head and the tape cleaner. When the tape speed falls below a preselected minimum, the device mechanically displaces the magnetic tape without significant wear on the tape.

8 Claims, 4 Drawing Figures

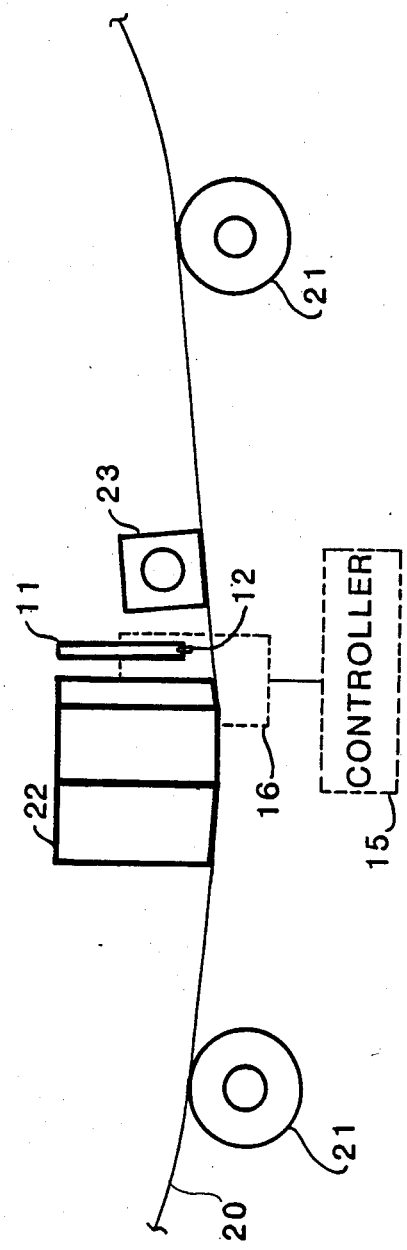

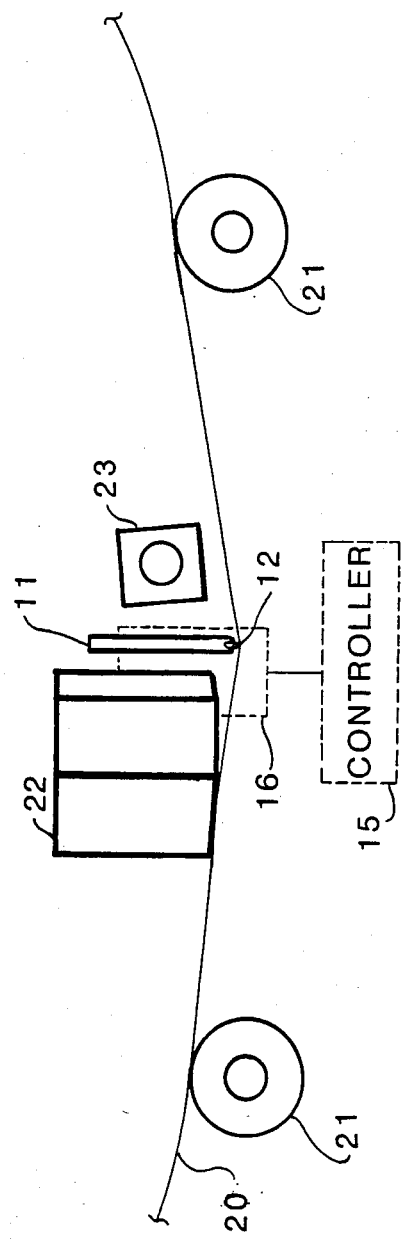

ANTI-ADHESION DEVICE FOR MAGNETIC TAPE DRIVE

BACKGROUND OF THE INVENTION

Magnetic tape drives are subject to a phenomenon known as "stiction" which is characterized by a strong adhesion between two highly polished surfaces. In a tape drive, stiction usually occurs between the oxide side of the tape and certain components in the tape transport such as the head or tape cleaner.

The stiction phenomenon is aggravated by high ambient temperature or humidity. With the advent of computer systems that are intended to operate in "ordinary" or non-controlled environments, stiction becomes a major problem. In addition, stiction is somewhat dependent on the type or manufacture of the magnetic tape, even to the extent that certain tapes will operate satisfactorily while others will fail completely under identical conditions.

Stiction causes several different problems in a tape drive and under some circumstances may cause complete failure. For example, if the tape is stopped or moving slowly and it adheres to one or more elements of the tape transport, excessively high tension will be required to free the tape. If the tension required is too great, the tape transport may simply shut down to avoid damaging the tape.

Even if the tape transport does not shut down, the tape is likely to break free suddenly, which creates a large amount of slack. If there is too much slack for the tape transport to buffer, the transport may lose its fix on the tape's position, which would render it unable to correctly read or write.

In a conventional start/stop drive, the tape transport is capable of buffering perhaps several inches of tape by vacuum columns. Start/stop drives are also designed to accelerate the tape rapidly with high tension in order to execute commands more quickly. The result is that if the adhesive force is not overwhelming, a start/stop drive will have sufficient power to jerk the tape free and to buffer the attendant slack. For this reason, the stiction problem may become transparent to the user until a tape is actually damaged.

In contrast, however, a streaming tape drive has neither a vacuum column nor capstan and cannot accelerate the tape nearly as fast as a start/stop drive. A streaming tape drive's speed sensor cannot tolerate the high accelerations used in a start/stop drive without slippage and resulting error. Furthermore, the tape buffering capacity of a streaming tape drive is considerably less than that of a start/stop drive. Thus, the stiction phenomenon is a much more serious problem in a streaming tape drive than a start/stop drive.

One previous "solution" to the stiction problem was for the drive manufacturer to certify only particular types of magnetic tape and to guarantee performance only with such tape. This approach is unsuitable for users who may have their own criteria for tape selection. Similarly, the drive manufacturer may specify excessively stringent environmental conditions (e.g. an air conditioned, low humidity room) for guaranteed performance, which again serves to merely transfer the problem to the user.

Another solution was a moveable magnetic head which would retract when the tape stopped or was moving too slowly. This technique is not viable in a mass data storage device which processes data at high densities and is consequently dependent on precise head alignment at all times. Furthermore, this approach does nothing to prevent stiction with other elements of the tape transport such as the tape cleaner.

BRIEF SUMMARY OF THE INVENTION

The present invention provides a device for preventing unwanted adhesion or stiction within a magnetic tape drive. This is accomplished by displacing the tape away from the head and tape cleaner when the tape speed falls below a preselected minimum. The present invention introduces no significant wear to the tape and may be incorporated into the tape path of a conventional tape transport.

DESCRIPTION OF THE DRAWINGS

FIG. 3 is a diagram of a tape transport which incorporates the anti-adhesion device of FIG. 2. The device is shown in the retracted or inactive position.

FIG. 4 is a diagram of a tape transport which incorporates the anti-adhesion device of FIG. 2. The device is shown in the extended or active position.

DETAILED DESCRIPTION OF THE INVENTION

Figure 1:
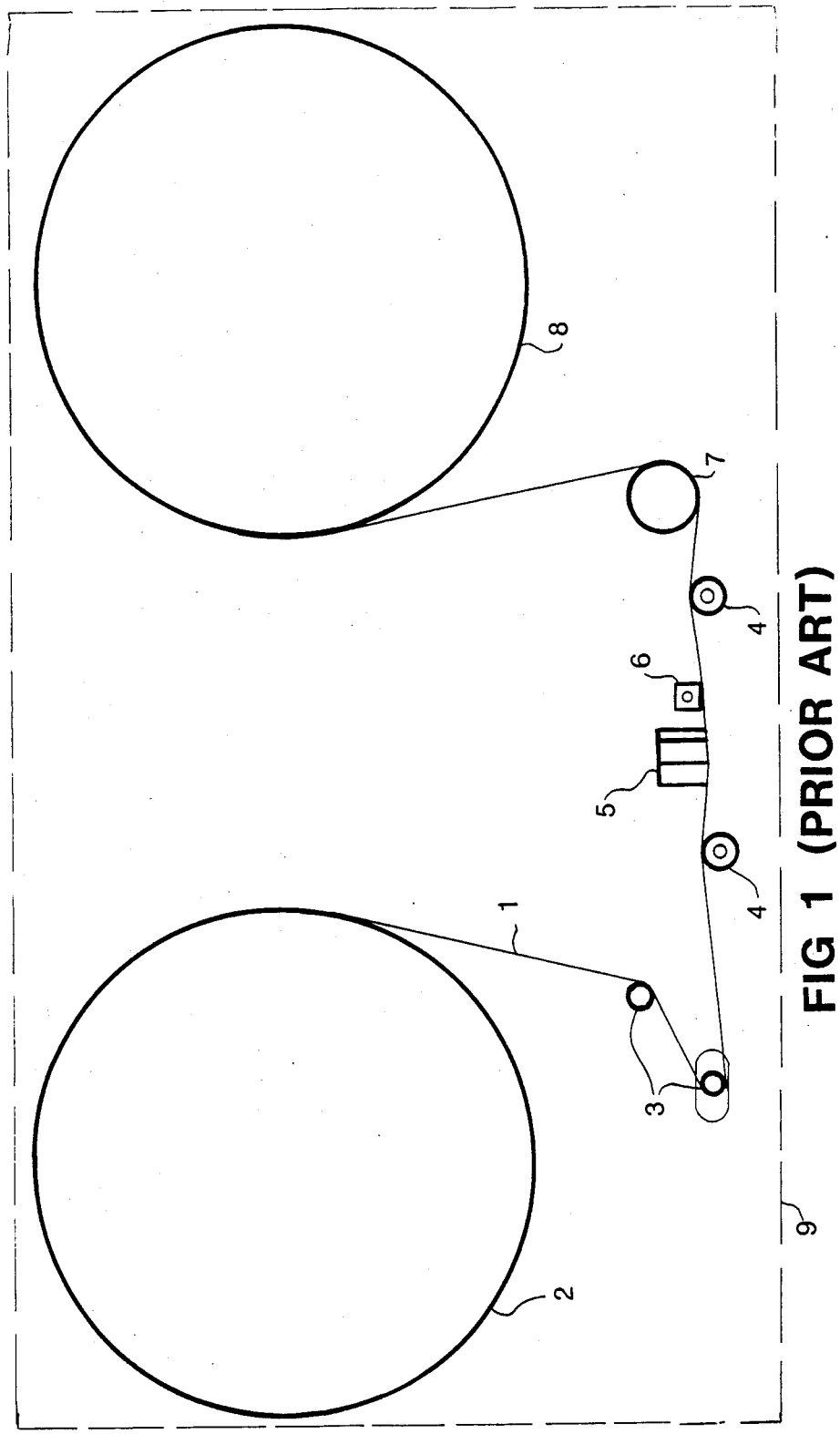
FIG. 1 is a diagram of a tape transport known in the prior art.

FIG. 1 is a diagram of a tape transport 9 known in the prior art. A magnetic tape 1 is fed off of a supply reel 2 and around buffer arm rollers 3. The magnetic tape 1 then passes over fixed guides 4 and a speed sensor 7 before winding onto a takeup reel 8. Located between the fixed guides 4 and in contact with the magnetic tape 1 are a magnetic head 5 and a ceramic tape cleaner 6. The speed sensor 7 may measure not only the speed of the magnetic tape 1, but may also calculate relative tape positions based on the speed readings.

When the magnetic tape 1 is moving slowly or is stopped, it will tend to adhere to the smooth surfaces of the magnetic head 5 and the ceramic tape cleaner 6. When adhesion occurs, greater than normal tension is needed to free the tape. If the tension exceeds a preselected maximum, the buffer arm rollers 3 will sense this condition and may shut down the transport. If the transport does not shut down, the slack created by the sudden release of the tape may cause slippage at the speed sensor 7. Since the speed sensor 7 relies on positive contact with the magnetic tape 1 to accurately measure tape speed and position, any significant slippage or excessive slack will result in a loss of position. In turn, this may result in an overwrite of good data or in improperly written data which is impossible to read.

Figure 2:
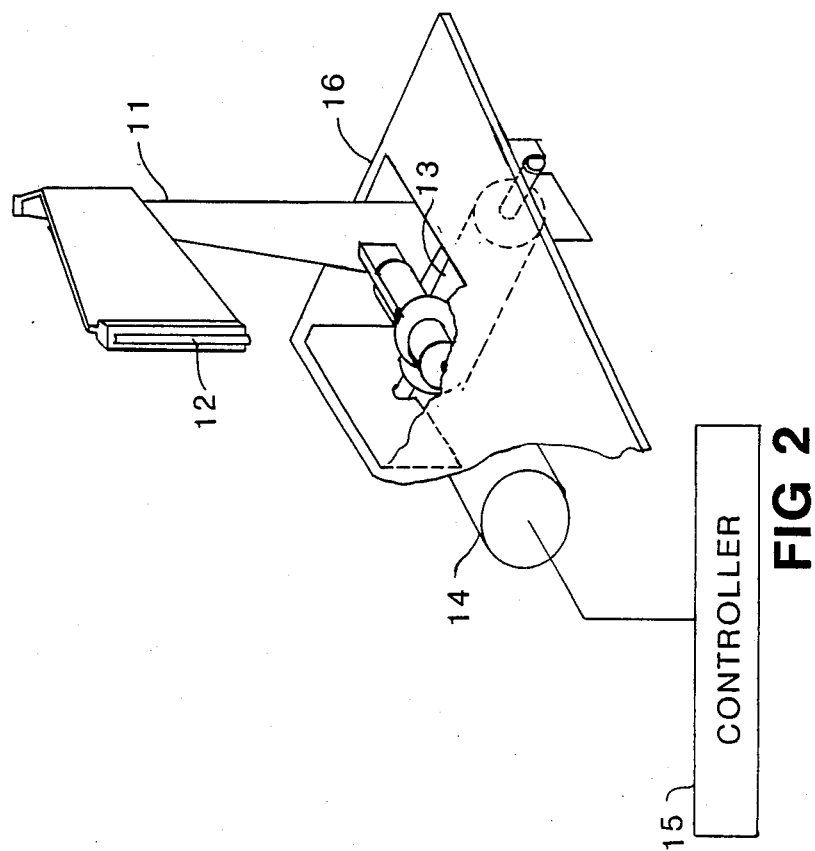
FIG. 2 is an isometric view of the preferred embodiment of an anti-adhesion device constructed in accordance with the present invention.

FIG. 2 is an isometric view of the preferred embodiment of an anti-adhesion unit 16 constructed in accordance with the present invention. A displacement lever 11 having a contact surface 12 rotates about an axle 13. An actuator 14 is coupled to the displacement lever 11 and propels the rotation of the lever about the axle 13. A controller 15 is coupled to the actuator 14.

The displacement lever 11 may be constructed of a variety of lightweight materials including plastic. The end of the displacement lever which supports the contact surface 12 is "slanted" so as to form an acute angle with the plane of the magnetic tape upon contact.

Thus, the lower portion of the contact surface 12 touches the magnetic tape first and actually begins the displacement before the entire contact surface is squarely touching the tape. The slanted displacement lever ensures that the tape will not be displaced so suddenly as to create excessive slack or slippage, but that displacement will occur rapidly enough to prevent adhesion.

The contact surface 12 is composed of a non-magnetic, low friction material such as series 300 stainless steel or alumina. The contact surface 12 is shaped as a cylinder or pin to further reduce friction with the magnetic tape during displacement.

The actuator 14 must have sufficient power to move the displacement lever 11 rapidly from the retracted position to the extended position. The actuator 14 may be a small solenoid or other small, commercially available motor.

The controller 15 is responsible for sensing the speed of the magnetic tape and for activating or deactivating the actuator 14 in response thereto. Specifically, the controller 15 performs a logical comparison of the actual tape speed with a preselected minimum tape speed. If the comparison indicates that the tape is moving too slowly and that adhesion is likely to occur, the controller 15 will activate the actuator 14, which in turn will cause a displacement of the magnetic tape as discussed in detail below. Conversely, if the tape has been previously displaced but the comparison performed by the controller 15 indicates that the tape speed has increased to a level greater than the preselected minimum, the controller 15 will deactivate the actuator 14 and the tape will return to its "normal" operating position.

The controller 15 may comprise any of a number of devices, all of which may be readily constructed by any person having ordinary skill in the art of control circuit design. For example, a frequency-to-voltage converter may be constructed which receives a signal (from a speed sensor on the tape transport) whose frequency is proportional to the tape speed. The signal is subsequently converted to a voltage and compared to a "threshold" voltage which is proportional to the preselected minimum tape speed. Alternatively, the controller 15 may comprise any of a number of commercially available microprocessors that has been programmed in accordance with the logical comparison algorithm described above.

The operation of the anti-adhesion unit 16 may be understood first with reference to FIG. 3. A magnetic tape 20 is threaded around fixed guides 21 and is in contact with a magnetic head 22 and a ceramic tape cleaner 23. The displacement lever 11 of the anti-adhesion unit 16 is positioned between the magnetic head 22 and the ceramic tape cleaner 23 so as to effectively displace the magnetic tape from both. The contact surface 12 is facing toward the magnetic tape 20.

The displacement lever 11 is retracted away from the magnetic tape 20, which means that the tape is moving with sufficient speed, as determined by the controller 15, to prevent adhesion with the magnetic head 22 and the ceramic tape cleaner 23. To summarize, FIG. 3 represents a state of "normal" operation with the anti-adhesion unit 16 in the retracted or inactive position.

In contrast, FIG. 4 shows an anti-adhesion unit 16 in the extended or active position. The controller has sensed that the tape speed is too slow to prevent adhesion and has activated the actuator 14 shown in FIG. 2. The actuator 14 has driven the displacement lever 11 into the extended position, placing the contact surface 12 against the magnetic tape 20 and causing a displacement in a direction perpendicular to the plane of the tape. The displacement is sufficient to eliminate all contact between the tape and the ceramic tape cleaner 23 while partially eliminating contact between the tape and the magnetic head 22.

Subsequently, when the controller 15 senses that the tape speed has increased sufficiently to prevent adhesion, the actuator 14 will be deactivated, the displacement lever 11 will retract and normal operation will resume.

We claim:

1. An apparatus for preventing adhesion between a magnetic tape and elements of a tape transport, said apparatus comprising:
   displacement means for moving the magnetic tape in a direction perpendicular to the plane of said tape;
   actuator means, coupled to the displacement means, for driving the displacement means; and
   controller means, coupled to the actuator means, for sensing the speed of the magnetic tape and regulating the actuator means in response thereto.

2. An apparatus as in claim 1 wherein said displacement means comprises a lever having a contact surface which forms an acute angle with the plane of the magnetic tape upon initial contact.

3. An apparatus as in claim 1 wherein said displacement means comprises a stainless steel contact surface.

4. An apparatus as in claim 1 wherein said displacement means comprises an alumina contact surface.

5. An apparatus as in claim 1 wherein said actuator means comprises a solenoid.

6. An apparatus as in claim 1 wherein said controller means compares the actual tape speed to a preselected minimum tape speed and activates or deactivates the actuator means in response thereto.

7. An apparatus as in claim 1 wherein said controller means comprises a frequency-to-voltage converter.

8. An apparatus as in claim 1 wherein said controller means comprises a microprocessor.

* * * * *